(12) United States Patent
Ikeuchi et al.

(10) Patent No.: US 7,480,111 B2
(45) Date of Patent: Jan. 20, 2009

(54) DATA LIBRARY DEVICE

(75) Inventors: Masahito Ikeuchi, Ehime (JP);
Yoshifumi Shiraishi, Ehime (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 10/587,047

(22) PCT Filed: Jan. 28, 2005

(86) PCT No.: PCT/JP2005/001238

§ 371 (c)(1),
(2), (4) Date: Jul. 24, 2006

(87) PCT Pub. No.: WO2005/073965

PCT Pub. Date: Aug. 11, 2005

(65) Prior Publication Data

US 2008/0239561 A1    Oct. 2, 2008

(30) Foreign Application Priority Data

Jan. 30, 2004 (JP) .............................. 2004-022331

(51) Int. Cl.
*G11B 19/02* (2006.01)
*G11B 15/68* (2006.01)
(52) U.S. Cl. ..................................... 360/69; 360/92.1

(58) Field of Classification Search .................. None
See application file for complete search history.

(56) References Cited

U.S. PATENT DOCUMENTS

| 6,693,759 B2 * | 2/2004 | Owens et al. ................. 360/69 |
| 6,873,491 B2 * | 3/2005 | Hoelsaeter et al. ......... 360/92.1 |
| 2002/0057513 A1 | 5/2002 | Porter et al. |

FOREIGN PATENT DOCUMENTS

WO    WO 01/09888 A1    2/2001

OTHER PUBLICATIONS

"DDS-built-in Backup Library," *New Technology of Matsushita Electric Technical Industrial Co., Ltd. 2002* (May 2003) pp. 155-156.

* cited by examiner

*Primary Examiner*—Jason C Olson
(74) *Attorney, Agent, or Firm*—Steptoe & Johnson LLP

(57) ABSTRACT

Magazine insertion is detected and suction of the magazine toward the deep end of a data library device casing is started. An identification code recorded on a recording medium cassette contained in the magazine is read at the timing when the cassette passes a read area of a read device arranged on the data library device case and stored in correspondence with the storage position. Operation is performed according to the storage when transferring the recording medium cassette between the magazine and a drive.

3 Claims, 11 Drawing Sheets

PRIOR ART

DATA LIBRARY DEVICE

CLAIM OF PRIORITY

This application claims priority under 35 USC 371 to International Application No. PCT/JP2005/001238, filed on Jan. 28, 2005, which claims priority to Japanese Patent Application No. 2004-022331, filed on Jan. 30, 2004, each of which is hereby incorporated by reference in its entirety.

TECHNICAL FIELD

The present invention relates to a data library device that has a plurality of recording medium cassettes and sets a target one of them into a drive device to read out or back up data.

BACKGROUND ART

A literature ("2002 New Technology of Matsushita Electric", May 2003, pp. 155-159, (DDS-Equipped Backup Library), issued by R&D Planning Office) describes a data library device illustrated in FIG. 10. This data library device is configured as follows. A plurality of tape cassettes 1 are annularly arranged on a turn table 2. A turn table drive mechanism 3 allows the turn table 2 to rotate. An elevator mechanism 5 inserts/removes a target one of the tape cassettes 1 contained in garages 4 of the turn table 2 into/from a tape drive 6. Thus, data is read out from or written to the target tape cassette.

DISCLOSURE OF THE INVENTION

Problems to be Solved by the Invention

According to the foregoing configuration, the operation for inserting/removing the tape cassette 1 into/from the tape drive 6 can be automated within a range of a data library contained in the turn table 2. However, if the number of tape cassettes 1 each contained as a data library in a limited space must be increased, a magazine type illustrated in FIGS. 11A and 11B is more suitable than such a turn table type.

A data library device of this magazine type is configured as follows. As illustrated in FIG. 11A, a tape drive 6 and magazines 8a and 8b are arranged in a data library device casing 7. A tape cassette 1 is contained in the tape drive 6, and a picker 9 transfers the recording medium cassette between the magazine 8a or 8b and the tape drive 6.

The magazines 8a and 8b are fixed to the data library device casing 7, and the picker 9 is driven upon insertion/removal of the tape cassette 1. FIG. 11B illustrates a movement position of the picker 9 in the case that a tape cassette 1a4 is picked up from a storage position located at a deepest end of the magazine 8a and, then, is set into the tape drive 6.

Recently, along with a requirement in size reduction of the data library device casing 7, there is required that the number of tape cassettes to be stored in a limited space is increased.

The tape cassettes stored in the storage positions of the magazines 8a and 8b are recognized as follows. That is, the tape cassettes are stored in the storage positions of the magazines 8a and 8b and, then, the correspondence therebetween is inputted through a numeric keypad or the like. Alternatively, the picker 9 is provided with a barcode label reader, a barcode label affixed to each tape cassette is read by the reader while the picker 9 is moved, and data read out from the barcode label by the reader is written to a memory in correspondence with each of the storage positions of the magazines 8a and 8b.

It is an object of the present invention to provide a recording medium cassette recognition method in a data library device, in which, in operation, it is unnecessary to input the correspondence between the storage positions of the magazines 8a and 8b and the tape cassettes through a numeric keypad or the like and it is unnecessary to read the barcode label while the picker 9 is moved.

Means for Solving the Problems

According to a first aspect of the present invention, there is provided a recording medium cassette recognition method for recognizing a recording medium cassette contained in a storage position of a magazine insertable/removable into/from a data library device casing provided in a data library device, the magazine having a plurality of recording medium cassette storage positions linearly arranged in a longitudinal direction, the data library device picking up a target recording medium cassette from the magazine and setting the target recording medium cassette into a drive, wherein the method comprises detecting insertion of the magazine into the data library device casing and starting suction of the magazine toward a deep end of the data library device casing, reading an identification code recorded on the recording medium cassette at a timing when the cassette passes a read area of a read device arranged on the data library device casing and storing the identification code in correspondence with the storage position, and transferring the recording medium cassette between the magazine and the drive according to the stored data.

According to a second aspect of the present invention, the data library device comprises a data library device casing including a magazine having a plurality of storage positions for recording medium cassettes, the storage positions being formed linearly in a longitudinal direction, a drive for setting a recording medium cassette therein, the recording medium cassette having been picked up from one of the storage positions of the magazine, a picker for transferring the recording medium cassette between the magazine and the drive, and a drive device for allowing the magazine to move to the storage position of the target recording medium cassette by means of the picker, wherein the data library device further comprises a controller for detecting insertion of the magazine into the data library device casing to issue, to the drive device, a command for starting movement of the magazine toward a deep end of the data library device casing, for reading an identification code recorded on the recording medium cassette passing a read area of a read device provided on the data library device casing, and for storing the identification code in correspondence with the storage position.

According to a third aspect of the present invention, in the data library device, the read device is provided on the picker.

EFFECT OF THE INVENTION

With the recording medium cassette recognition method, in the data library device according to the present invention, when a magazine insertable/removable into/from a data library device casing is inserted into the data library device casing, an identification code is read at a timing when a cassette passes a read area of a read device arranged on the data library device casing and, then, is stored in correspondence with a storage position. Therefore, upon start of an action, it is unnecessary to read the identification code after insertion of the magazine into the data library device casing. Thus, it is possible to operate the data library device immediately.

BEST MODE FOR CARRYING OUT THE INVENTION

Hereinafter, description will be given of a recording medium cassette recognition method in a data library device according to the present invention on the basis of a specific embodiment illustrated in FIGS. 1 to 9.

Figure 1:
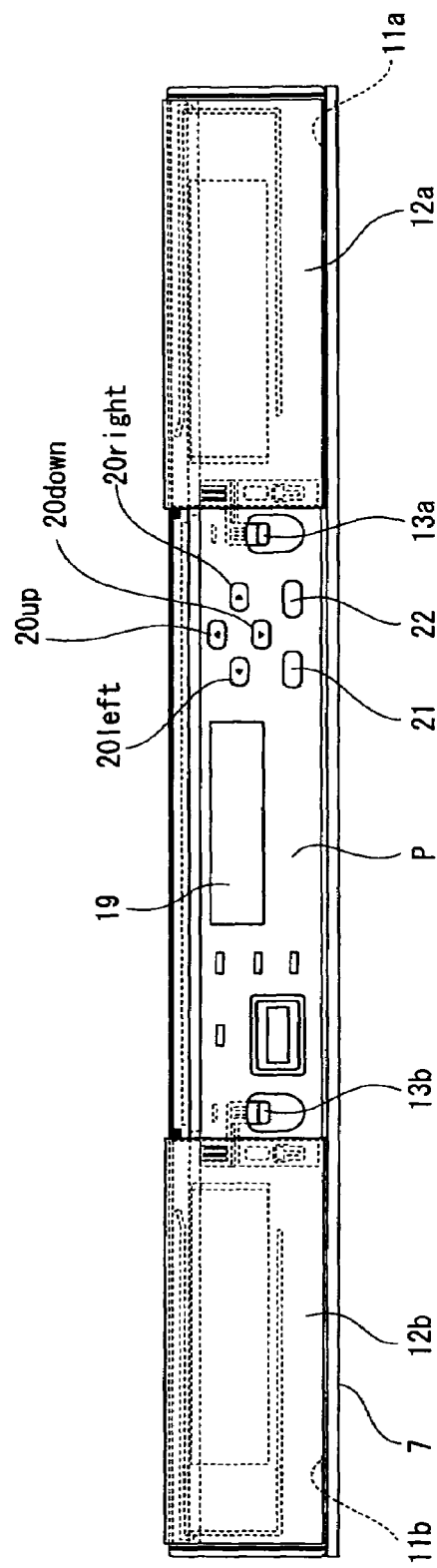
FIG. 1 is a front view of a data library device according to an embodiment of the present invention.
Figure 2:
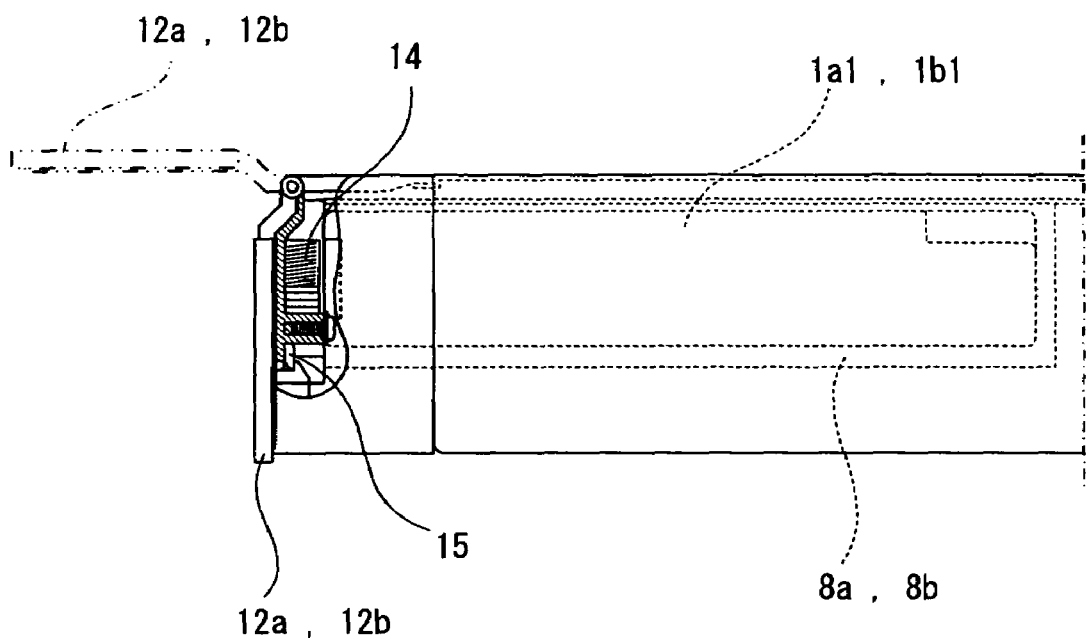
FIG. 2 is a side view of main parts according to the embodiment.

As illustrated in FIG. 1, openings 11a and 11b provided with door bodies 12a and 12b, respectively, are provided on a front panel P of a data library device casing 7. When an open/close button 13a provided on the front panel P is pushed up against the biasing force by a compression spring 14 illustrated in FIG. 2, a door lock 15 is disengaged, so that the door body 12a can be opened manually to a position shown by a phantom line. Similarly, the door body 12b can be opened manually by the pushing up of an open/close button 13b.

Figure 3:
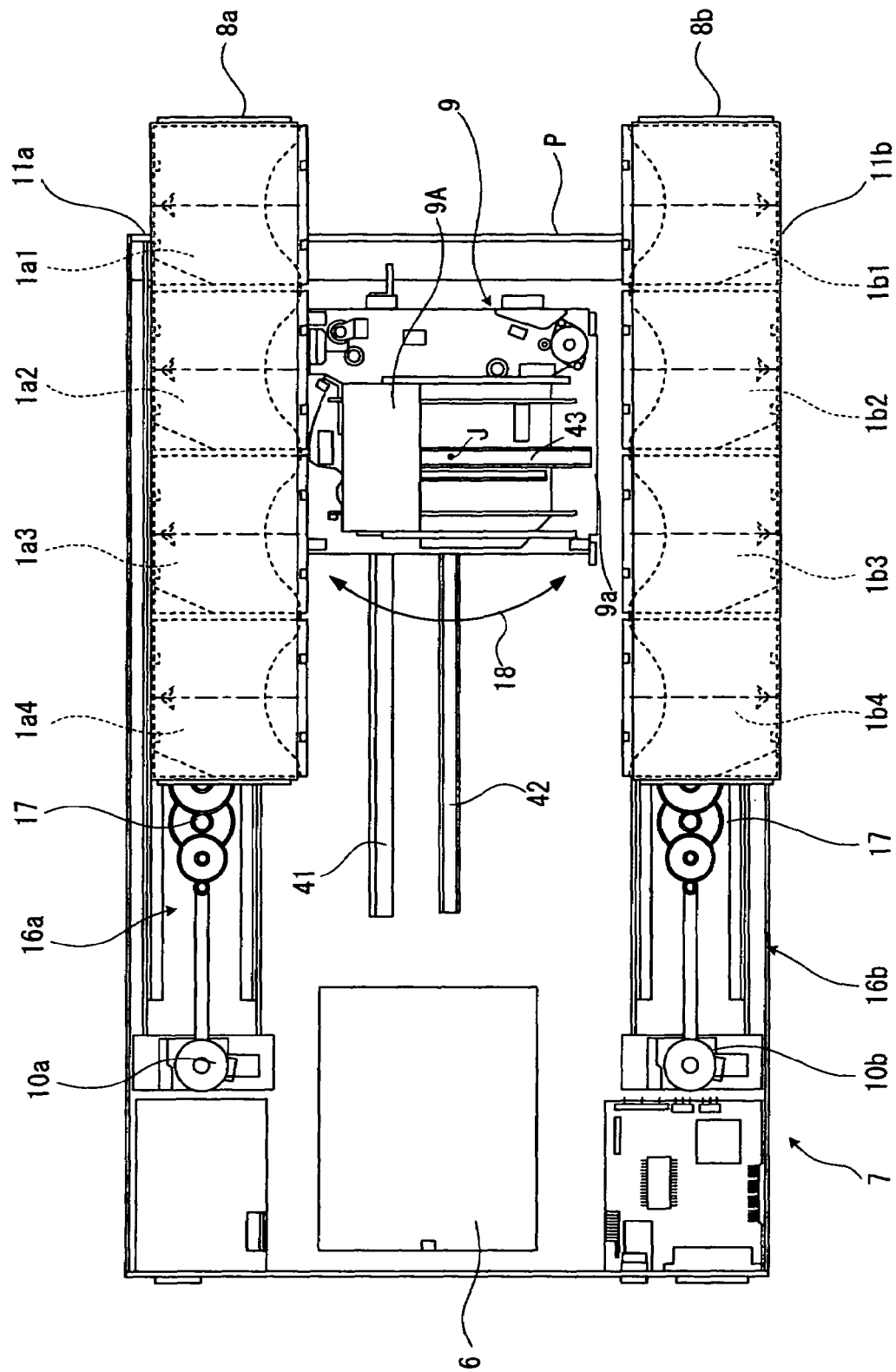
FIG. 3 is a plan view upon insertion/removal of a magazine according to the embodiment.

As illustrated in FIG. 3, magazines 8a and 8b can be inserted into/removed from the data library device casing 7 through the opened openings 11a and 11b. The magazine 8a has first to fourth storage positions in which tape cassettes (recording medium cassettes) 1a1 to 1a4 are stored, respectively, and the magazine 8b has first to fourth storage positions in which tape cassettes 1b1 to 1b4 are stored, respectively.

The magazines 8a and 8b inserted into the data library device casing 7 are engaged with drive devices 16a and 16b, respectively, and are fed to an interior of the data library device casing 7.

Herein, the drive devices 16a and 16b include stepping motors 10a and 10b each serving as a power supply, and power transmission mechanism units 17 for transmitting rotations of the stepping motors 10a and 10b to allow the magazines 8a and 8b to move linearly. Each power transmission mechanism unit 17 has a structure that no automatic stoppage due to friction occurs.

A tape drive 6 is disposed on a center of a deep end of the data library device casing 7.

A picker 9 transferring the tape cartridges 1a1 to 1a4 between the tape drive 6 and the magazine 8a and, also, transferring the tape cartridges 1b1 to 1b4 between the tape drive 6 and the magazine 8b is movable in a longitudinal direction of each of the magazines 8a and 8b along a guide rail 42. The guide rail 42 is laid down between the magazines 8a and 8b and the tape drive 6, is laid down in parallel with a rack 41 attached to the data library device casing 7 in such a manner that a driving gear (not illustrated) is meshed with the rack 41, and is fixed to the data library device casing 7. The picker 9 is equipped with a picker main body 9A capable of advancing to/retreating from a position where a tip end thereof is engaged with the tape cassette stored in the magazine 8a or 8b.

More specifically, the picker main body 9A can advance/retreat, along a guide rail 43 provided to the picker 9, to/from a position where the tip end thereof is engaged with the tape cassette. In accordance with the magazine 8a or 8b from which the cassette will be picked up, only the picker main body 9A rotates horizontally with respect to the picker 9. A rotational center J of the picker main body 9A is located on the guide rail 43 and above the guide rail 42 of the data library device casing 7. FIGS. 3 to 6 and the like illustrate a horizontal planar position of the rotational center J of the picker main body 9A with the use of a phantom line.

Figure 7:
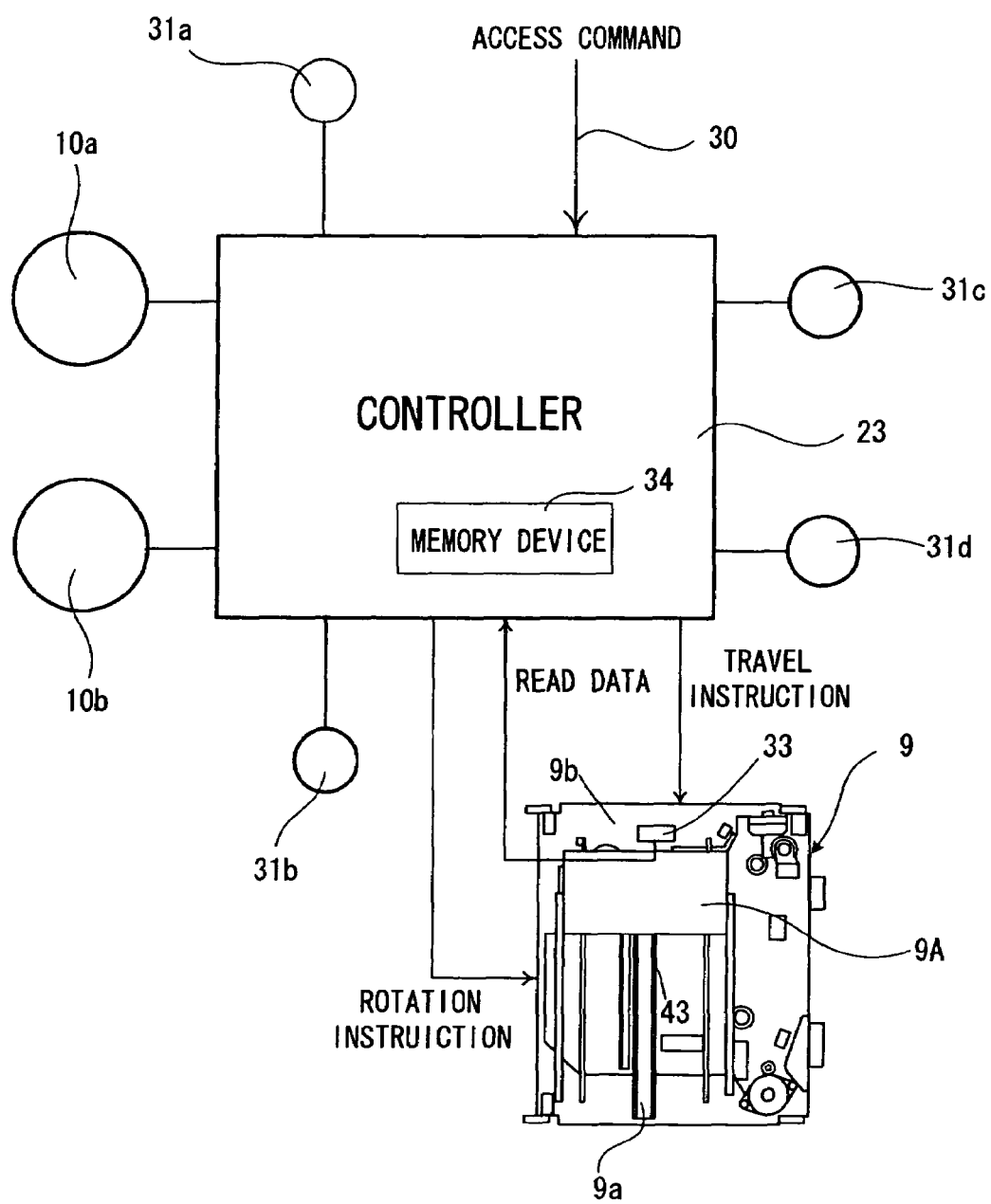
FIG. 7 illustrates a controller and peripherals thereof.

A controller 23 operating the picker 9 and the drive devices 16a and 16b is configured as illustrated in FIG. 7. The controller 23 operates the stepping motors 10a and 10b and the picker 9 in accordance with an access command 30 for designating a tape cassette to be transferred from one of the magazines 8a and 8b. The controller 23 is connected with a first sensor 31a detecting that the magazine 8a arrives at a home position, and a second sensor 31b detecting that the magazine 8b arrives at a home position.

Figure 4:
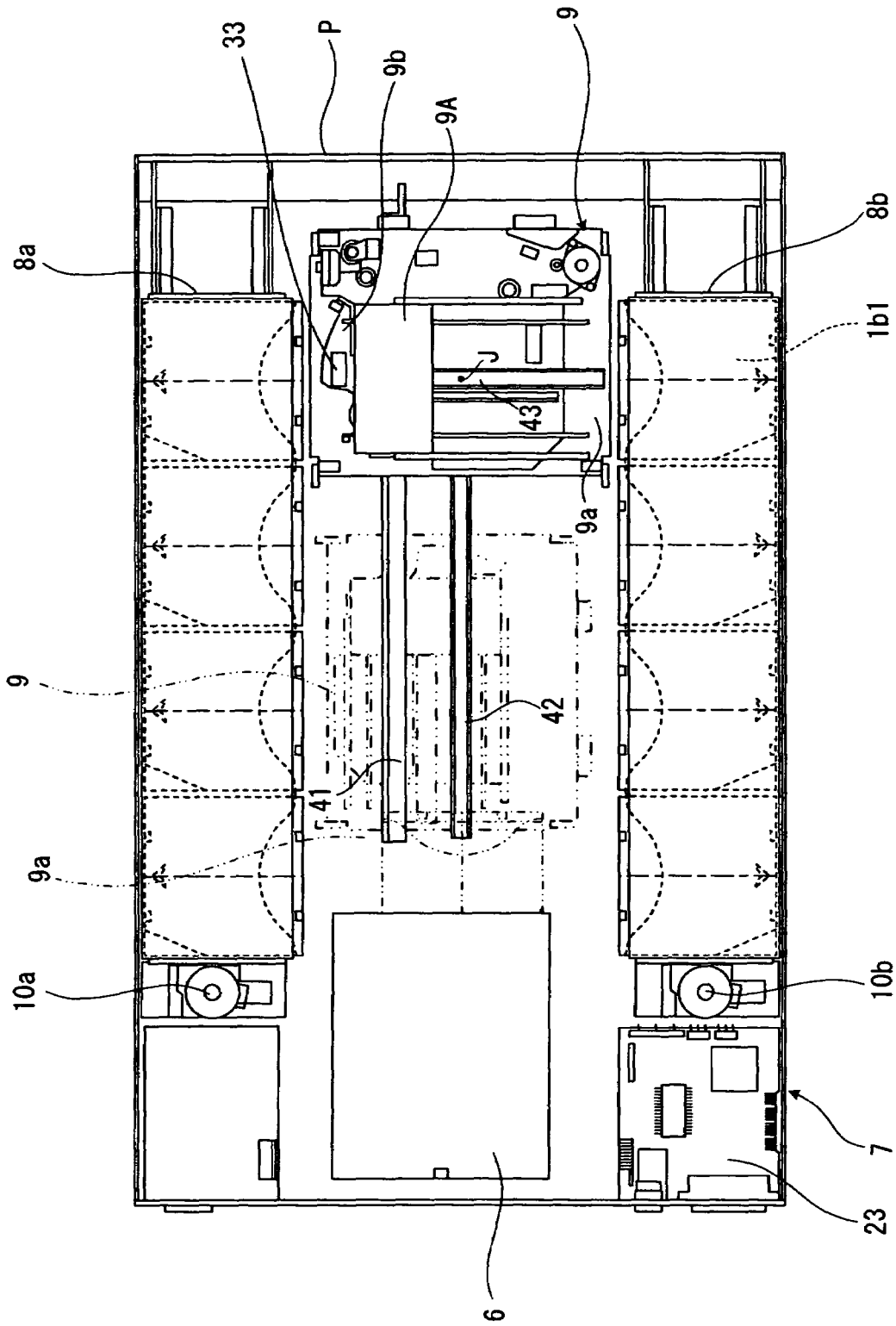
FIG. 4 is a plan view illustrating a step of setting a recording medium cassette picked up from a magazine into a drive device according to the embodiment.

Herein, the home positions of the magazines 8a and 8b are located at the deep end as illustrated in FIG. 4, respectively.

Further, the controller 23 is connected with a third sensor 31c detecting that a tip end of the magazine 8a passes through the opening 11a at the time when the magazine 8a is inserted into/removed from the data library device casing 7 through the opened opening 11a, and a fourth sensor 31d detecting that a tip end of the magazine 8b passes through the opening 11b at the time when the magazine 8b is inserted into/removed from the data library device casing 7 through the opened opening 11b.

Figure 8:
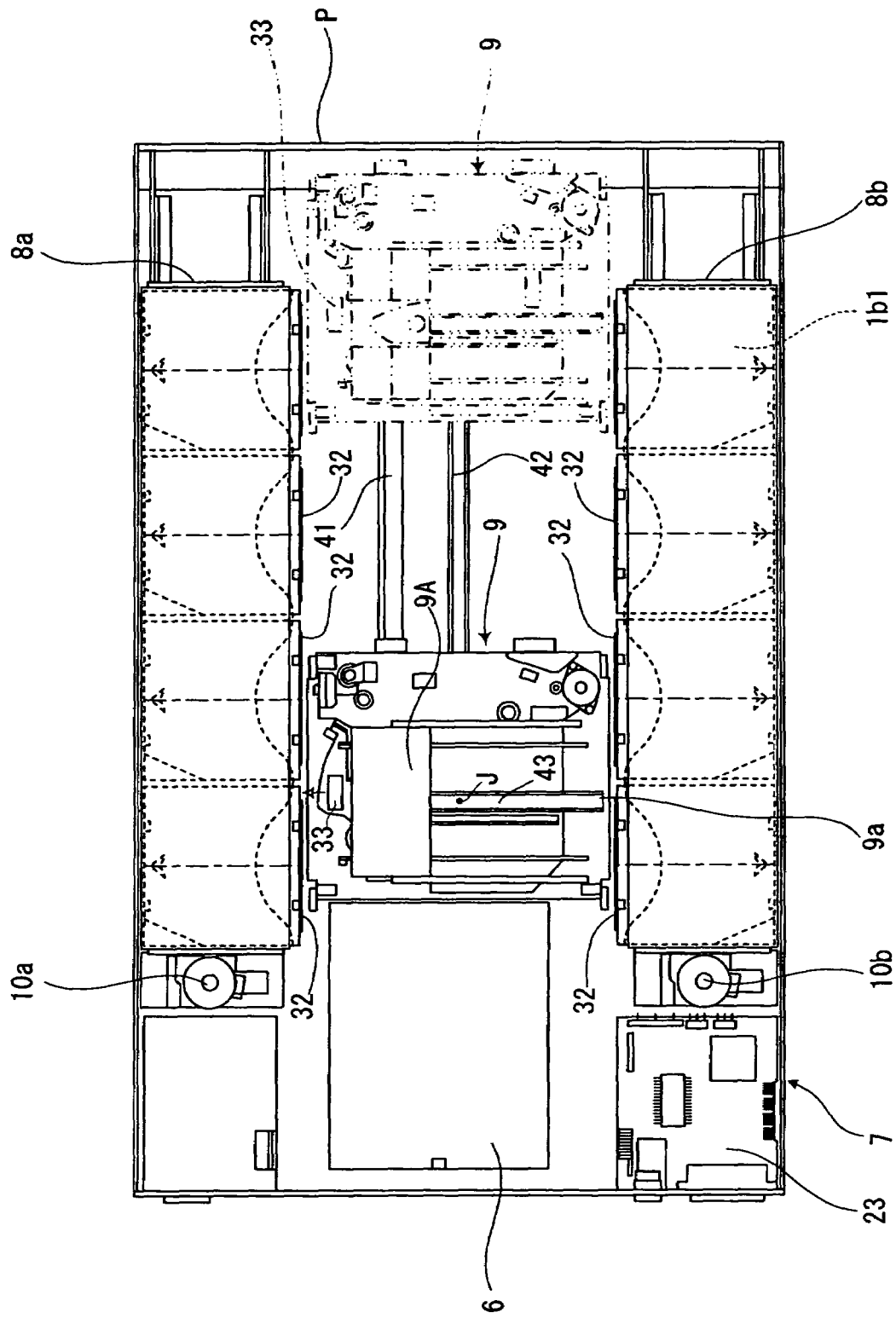
FIG. 8 is a plan view illustrating a magazine setting step.

As illustrated in FIG. 8, each of the tape cartridges 1a1 to 1a4 and 1b1 to 1b4 has a face opposing the picker 9, and a barcode label 32 recording therein an identification code is previously affixed to the face. Further, a barcode reader 33 for reading the barcode label 32 is attached to a base end 9b opposite to the tip end 9a of the picker 9.

Description will be given of a case that details displayed on a display unit 19 provided on the front panel P are operated by a combination of cursor keys 20up, 20down, 20right and 20left, an enter key 21 and an escape key 22 each provided on the front panel P and a command is issued so as to set a target one of the contained tape cartridges 1a1 to 1a4 and 1b1 to 1b4 into the tape drive 6.

If the controller 23 recognizes this command and, then, determines that the target tape cartridge is the tape cartridge 1b1 on the basis of details in a memory device 34 (to be described later), as illustrated in FIG. 4, the controller 23 allows the tip end 9a of the picker 9 to approach the tape cartridge 1b1. Thereafter, the picker 9 picking up the tape cartridge 1b1 rotates and, then, moves to a position shown by a phantom line which is a position immediately in front of the tape drive 6. The tape cartridge 1b1 picked up by the picker 9 is transferred to and set into the tape drive 6.

Similarly, the tape cartridge 1b2 and the tape cartridge 1b3 stored in the second storage position and the third storage position among the storage positions of the magazine 8b located at the home position are operated in accordance with the access command 30.

Figure 5:
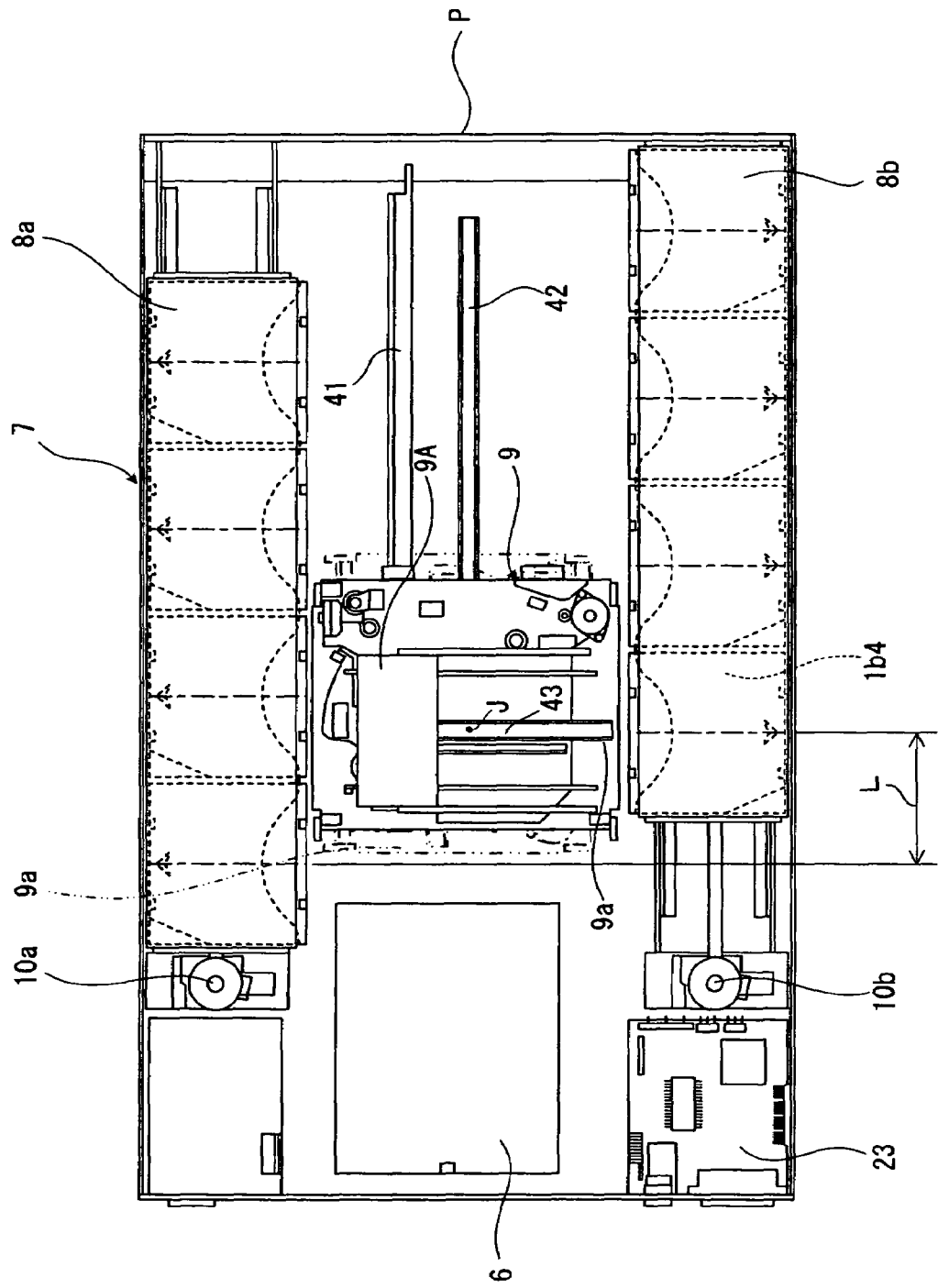
FIG. 5 is a plan view illustrating a step of setting a recording medium cassette picked up from a deep end of a magazine 8b into the drive device according to the embodiment.

If the controller 23 recognizes the access command 30 so as to set, into the tape drive 6, the tape cartridge 1b4 stored in the fourth storage position (storage position located at the deepest end), at least a part of which is overlapped with a lateral position of the tape drive 6, among the storage positions of the magazine 8b located at the home position, the controller 23 drives the stepping motor 10b to allow the magazine 8b to move toward the front panel P of the data library device casing 7 as illustrated in FIG. 5 and, then, allows the picker 9 to slide to the fourth storage position. Thereafter, the picker 9 picks up the tape cartridge 1b4 from the fourth storage position of the magazine 8b, and sets the tape cartridge 1b4 into the tape drive 6.

Similarly, the tape cartridges 1a1, 1a2 and 1a3 stored in the first, second and third storage positions, each of which is not overlapped with the lateral position of the tape drive 6, among the storage positions of the magazine 8a located at the home position are operated in accordance with the access command 30, respectively. However, in this case, the tip end 9a of the picker 9 is rotationally driven in the direction of an arrow 18 so as to be directed to the magazine 8a, and the picker 9 is slid to the corresponding storage position. Thereafter, the picker 9 picks up one of the tape cartridges 1a1 to 1a3 from the first to third storage positions of the magazine 8a in accordance with the access command 30 to set the tape cartridge thus picked up into the tape drive 6.

Figure 6:
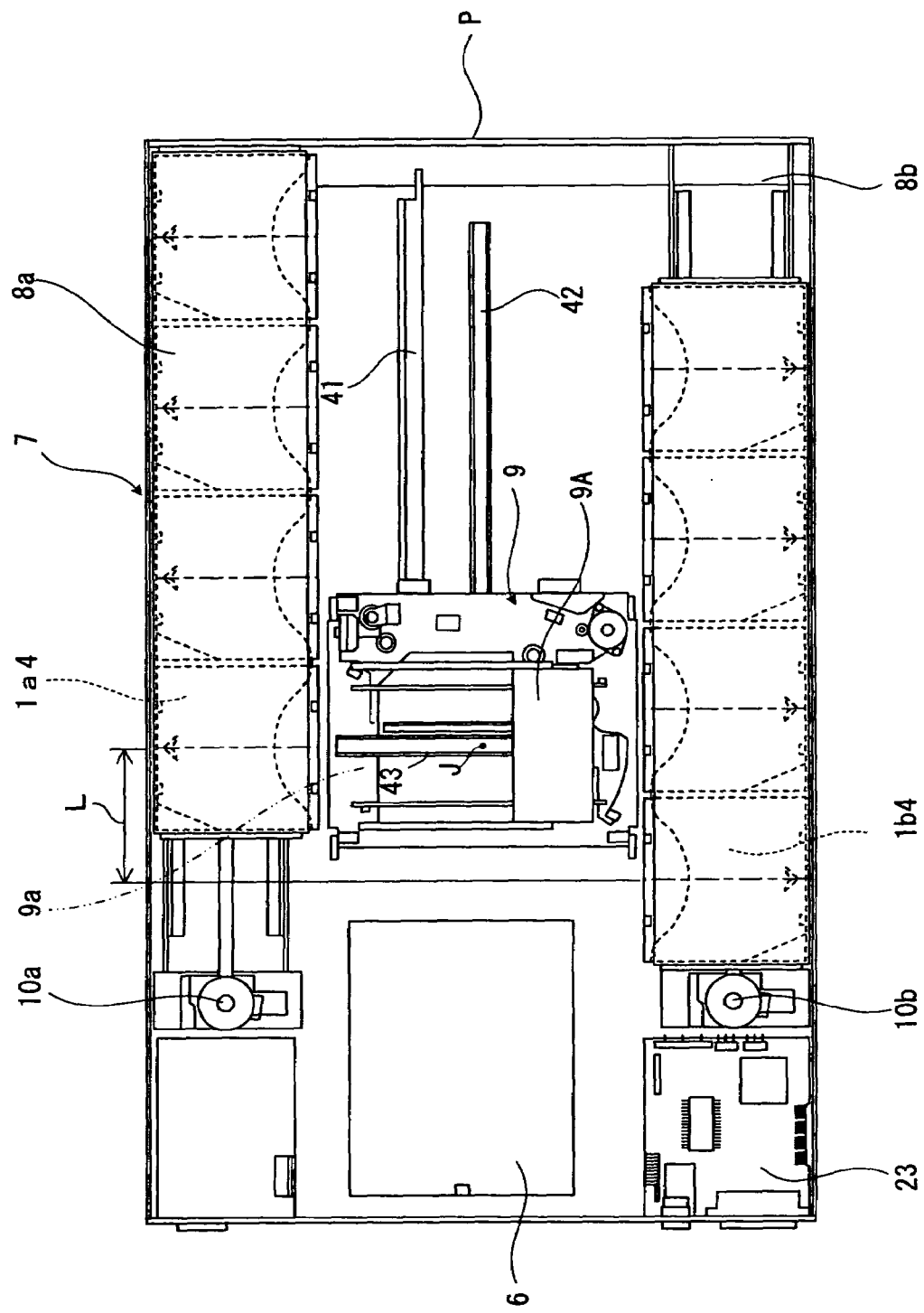
FIG. 6 is a plan view illustrating a step of setting a recording medium cassette picked up from a deep end of a magazine 8a into the drive device according to the embodiment.

If the controller 23 recognizes the access command 30 so as to set, into the tape drive 6, the tape cartridge 1a4 stored in the fourth storage position (storage position located at the deepest end), at least a part of which is overlapped with the lateral position of the tape drive 6, among the storage positions of the magazine 8a located at the home position, the controller 23 drives the stepping motor 10a to allow the magazine 8a to move toward the front panel P of the data library device casing 7 as illustrated in FIG. 6 and, then, allows the picker 9 to slide to the fourth storage position. Thereafter, the picker 9 picks up the tape cartridge 1b4 from the fourth storage position of the magazine 8a and sets the tape cartridge 1b4 into the tape drive 6.

Figure 11A:
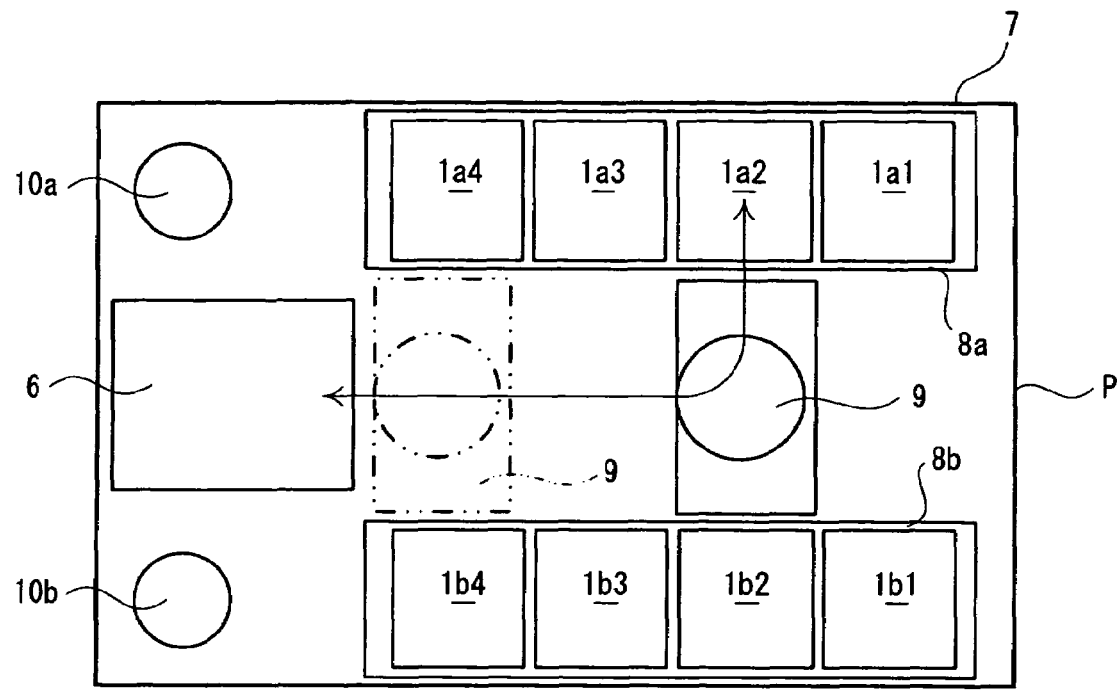
FIGS. 11A and 11B are plan views of a magazine-type data library device.
Figure 11B:
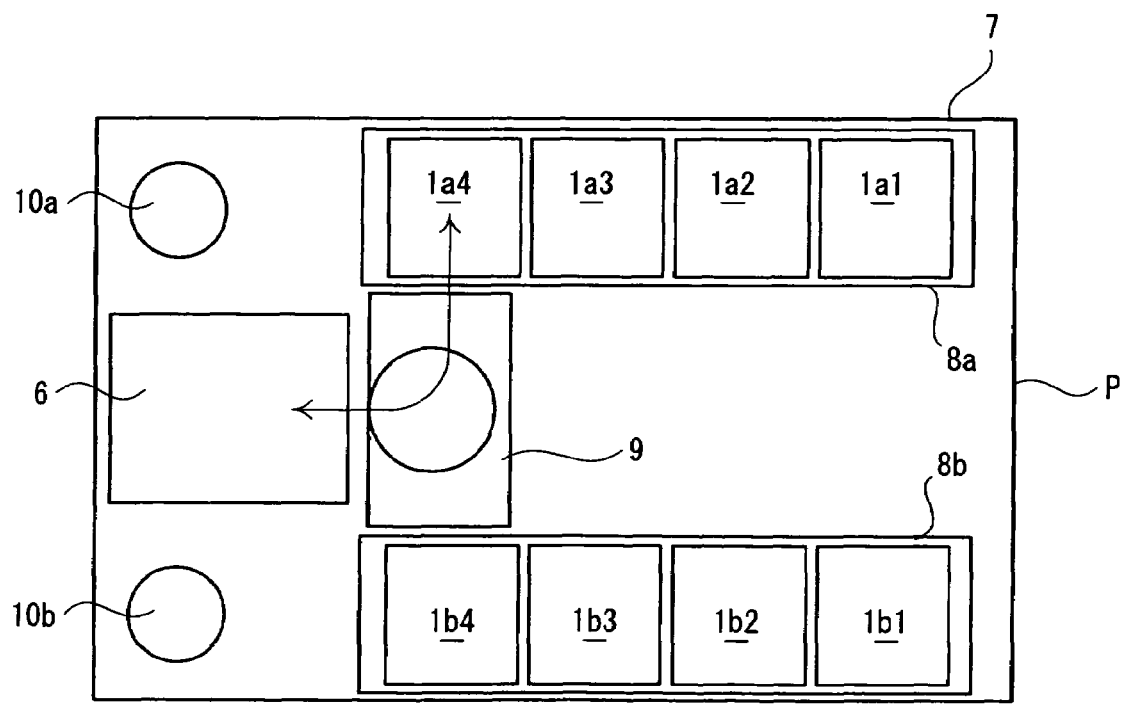

As described above, the data library device is configured in such a manner that the magazine 8a located at the home position has the fourth storage position at least a part of which is overlapped with the lateral position of the tape drive 6 and the magazine 8b located at the home position has the fourth storage position at least a part of which is overlapped with the lateral position of the tape drive 6. Further, the data library device is configured in such a manner that the drive devices 16a and 16b and the controller 23 allow the magazine to move between a position where the picker can pick up the recording medium cassette from the fourth storage position (storage position located at the deepest end) of each of the magazines 8a and 8b and a position where the storage position of the magazine located at the deepest end is located beside the drive. Therefore, it is possible to shorten a depth of the data library device casing 7 as illustrated in FIGS. 5 and 6 by a length L in comparison with a case configured as illustrated in FIG. 11.

Description will be given in detail of the memory device 34.

To the memory device 34, the correspondence between the storage position of each of the magazines 8a and 8b and the identification code of the tape cartridge stored in the storage position is previously written as follows.

Figure 9:
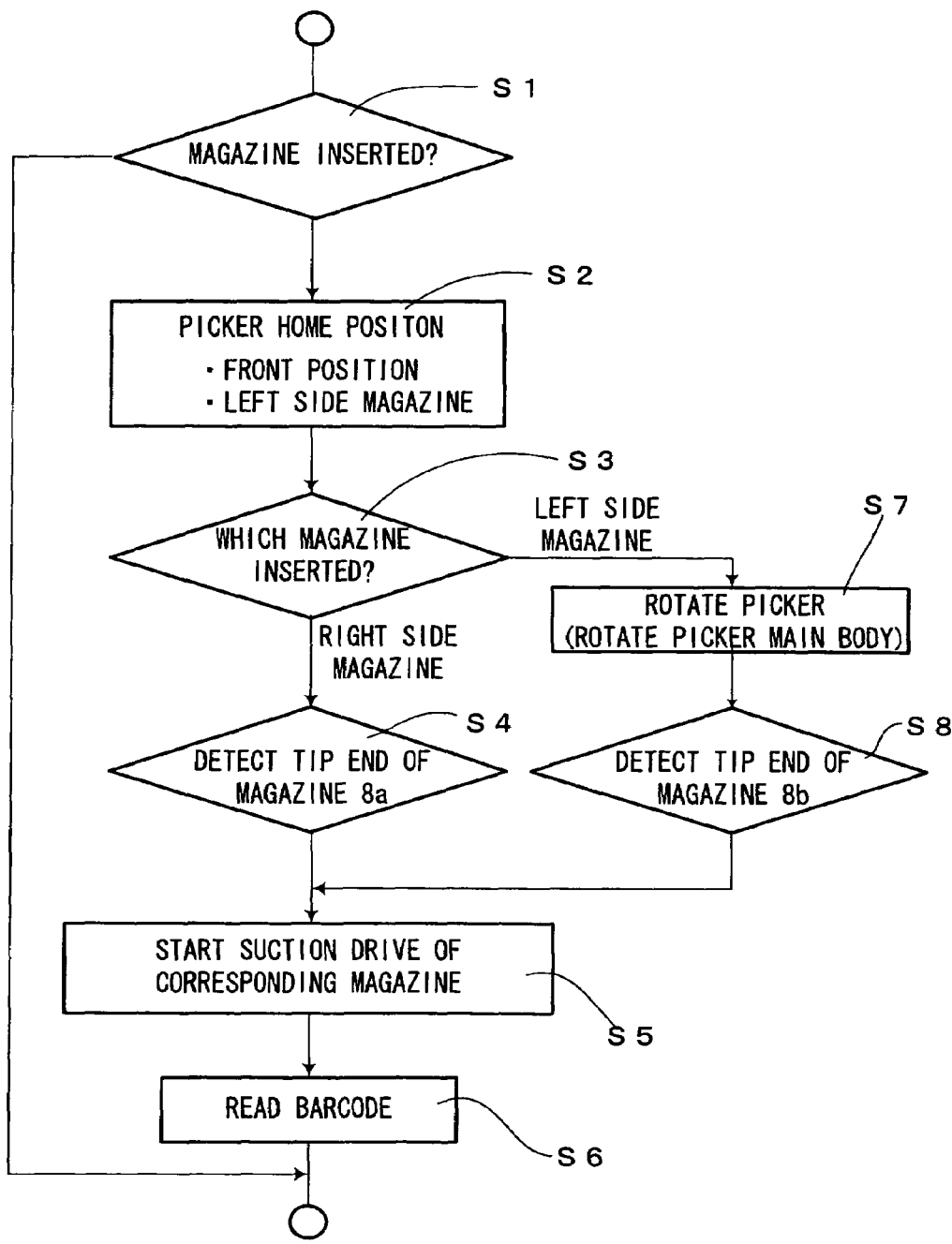
FIG. 9 is a flowchart of main parts of the controller in the magazine setting step.
Figure 10:
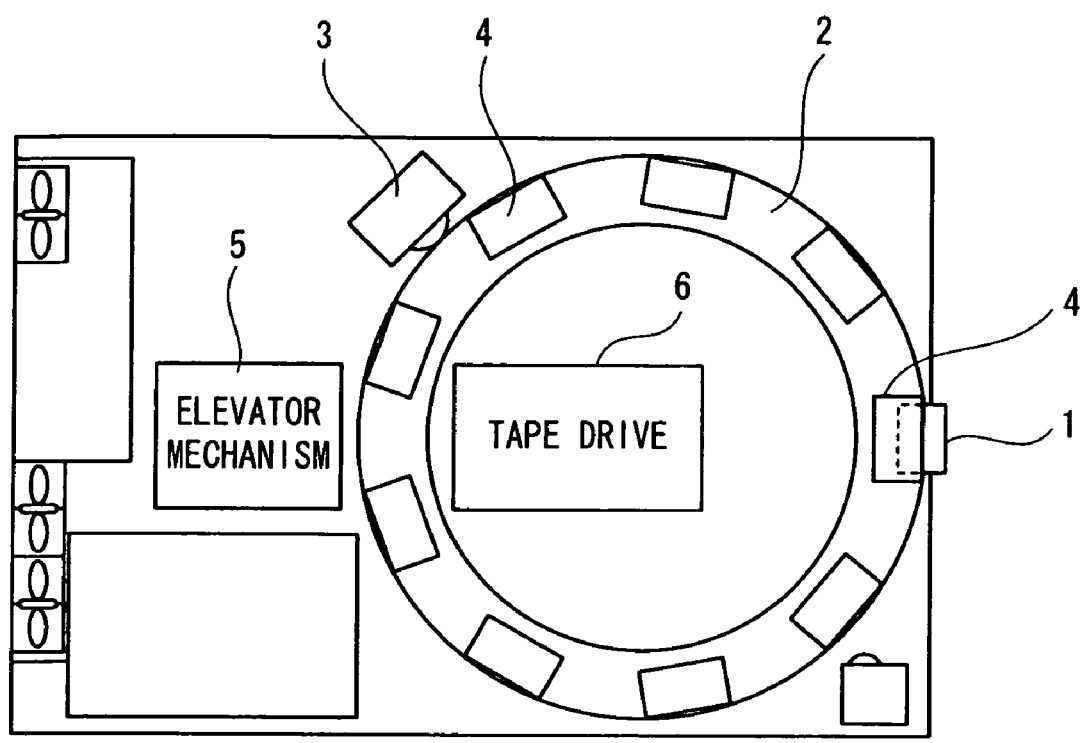
FIG. 10 is a plan view of a conventional DDS-type data library device.

FIG. 9 is a flowchart of a routine for executing this writing in the controller 23. Herein, the home position of the picker 9 is defined as a state that the tip end 9a is directed to a left magazine containment position at a position near the front panel P as shown by a phantom line in FIG. 8.

In the case that the magazine 8a is set into a right magazine containment position through the opening 11a, upon detection that the door body 12a is in an open state and there is no magazine 8a at the right magazine containment position, the controller 23 determines in step S1 whether or not an operation for inserting the magazine 8a is started. In step S2, the controller 23 sets the picker 9 on the home position. In step S3, the controller 23 determines whether or not the magazine 8a is inserted into the right magazine containment position, on the basis of a result of the detection in step S1. When the controller 23 detects in step S4 that the third sensor 31c detects that the tip end of the magazine 8a is inserted into the right magazine containment position, the controller 23 operates the stepping motor 10a to suck the magazine 8a toward the home position in step S5.

Herein, along with the suction of the magazine 8a, the barcode label 32 affixed to each of the tape cartridges 1a4 to 1a1 contained in the magazine 8a passes a read area of the barcode reader 33. In step S6, the barcode reader 33 sequentially reads the identification codes of the tape cartridges 1a4 to 1a1. The identification codes thus read are written to the memory device 34 in correspondences with the storage position of the magazine 8a.

In the case of the magazine 8b, step S7 is executed subsequent to step S3, so that the base end 9b of the picker 9 is directed to the left magazine containment position. When the controller 23 detects in step S8 that the fourth sensor 31d detects that the tip end of the magazine 8b is inserted into the left magazine containment position, the controller 23 operates the stepping motor 10b to suck the magazine 8b toward the home position in step S5.

Herein, along with the suction of the magazine 8b, the barcode label 32 affixed to each of the tape cartridges 1b4 to 1b1 contained in the magazine 8b passes the read area of the barcode reader 33. In step S6, the barcode reader 33 sequentially reads the identification codes of the tape cartridges 1b4 to 1b1. The identification codes thus read are written to the memory device 34 in correspondence with the storage position of the magazine 8b.

As described above, in the case that the magazines 8a and 8b are inserted into the data library device casing 7 in the operation in step S5, each barcode label 32 is read by the barcode reader 33 and the identification code is written to the memory device 34 in step S6. Therefore, it is unnecessary to execute the identification code reading step in such a manner that the magazines 8a and 8b are inserted into the data library device casing 7 and, then, the picker 9 is allowed to travel for reading of each barcode label 32, the magazines 8a and 8b are moved from the respective home positions and the magazines 8a and 8b and the picker 9 are moved relative to each other. Thus, a target tape cartridge can be immediately set into the tape drive 6.

INDUSTRIAL APPLICABILITY

The present invention can contribute to further increase in capacity of a data library device utilized upon backing up or reading out data.

The invention claimed is:

1. A recording medium cassette recognition method for recognizing a recording medium cassette contained in a storage position of a magazine insertable/removable into/from a data library device casing provided in a data library device, the magazine having a plurality of recording medium cassette storage positions linearly arranged in a longitudinal direction, the data library device picking up a target recording medium cassette from the magazine and setting the target recording medium cassette into a drive, the method comprising:

detecting insertion of the magazine into the data library device casing and starting suction of the magazine toward a deep end of the data library device casing;

reading an identification code recorded on the recording medium cassette at a timing when the cassette passes a read area of a read device arranged on the data library device casing, and storing the identification code in correspondence with the storage position; and transferring the recording medium cassette between the magazine and the drive according to the stored data.

2. A data library device comprising:

a data library device casing including a magazine having a plurality of storage positions for recording medium cassettes, the storage positions being formed linearly in a longitudinal direction, a drive for setting a recording medium cassette therein, the recording medium cassette having been picked up from one of the storage positions of the magazine, a picker for transferring the recording medium cassette between the magazine and the drive, and a drive device for allowing the magazine to move to the storage position of the target recording medium cassette by means of the picker; and a controller for detecting insertion of the magazine into the data library device casing to issue, to the drive device, a command for starting movement of the magazine toward a deep end of the data library device casing, for reading an identification code recorded on the recording medium cassette passing a read area of a read device provided on the data library device casing, and for storing the identification code in correspondence with the storage position.

3. The data library device according to claim 2, wherein the read device is provided on the picker.

* * * * *